United States Patent [19]

Lipschutz et al.

[11] 3,919,867

[45] Nov. 18, 1975

[54] ANTI-THEFT SAFETY LOCK DEVICE WITH MEANS PREVENTING ITS UNALLOWED REMOVAL FROM THE LOCK-HOLDER

[75] Inventors: Paul Lipschutz; Yves Remontet, both of Croissy sur Seine; Jean Leroy, Saint Cyr L'Ecole, all of France

[73] Assignee: Societe d'Exploitation des Brevets NEIMAN, Courbevoie, France

[22] Filed: Nov. 26, 1973

[21] Appl. No.: 419,002

[30] Foreign Application Priority Data
Nov. 24, 1972  France .............................. 72.41783

[52] U.S. Cl. ...................... 70/186; 70/252; 70/371; 70/416; 403/328
[51] Int. Cl.[2] ...................... B60R 25/02; E05B 9/06
[58] Field of Search ............. 70/181, 184, 185, 186, 70/252, 370, 371, 416, 419, 455; 403/324, 328, 378

[56] References Cited
UNITED STATES PATENTS

| | | |
|---|---|---|
| 1,589,169 | 6/1926 | Hugues .................................. 70/185 |
| 3,527,071 | 9/1970 | Warnod .................................. 70/252 |
| 3,753,361 | 8/1973 | Schiesterl .............................. 70/185 |
| 3,765,199 | 10/1973 | Wiczer .................................. 70/423 |

*Primary Examiner*—Albert G. Craig, Jr.
*Attorney, Agent, or Firm*—Nolte and Nolte

[57] ABSTRACT

An anti-theft device comprising a key-responsive safety lock mounted within a hollow tubular casing and held therein against removal by a spring-loaded locking pin radially movable in the lock stator and engageable at its inner end with the rotary plug of the lock for a given angular position thereof allowing removal of the device from the casing and at its opposite end with a hole extending through the casing wall for locking the lock in the casing, wherein the improvement consists in an outer shell integral with said casing and covering said hole while allowing access thereto through an opening of the shell the centre line of which extends at right angles to the centre line of said hole.

8 Claims, 13 Drawing Figures

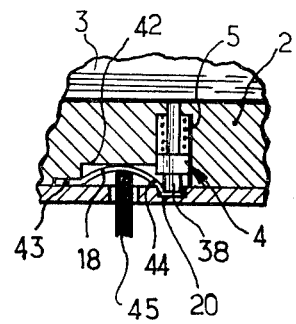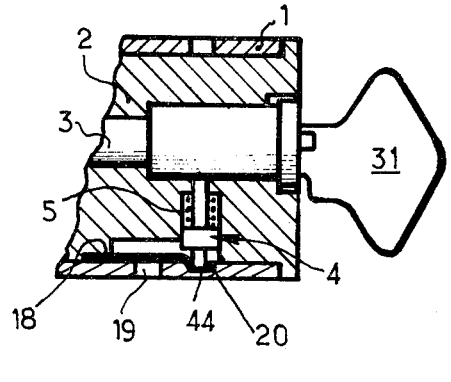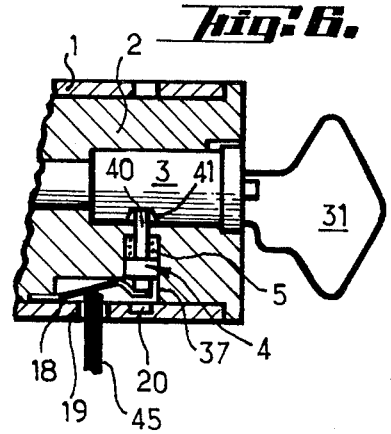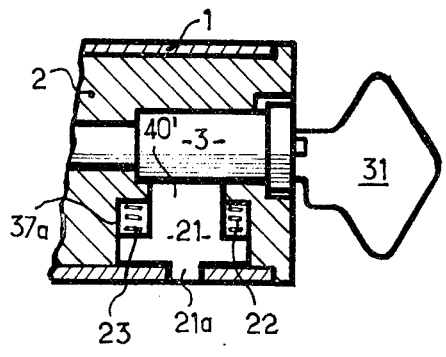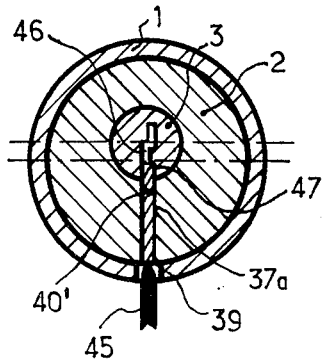

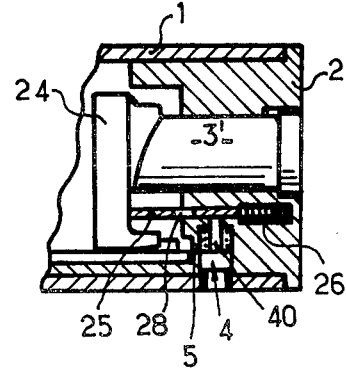
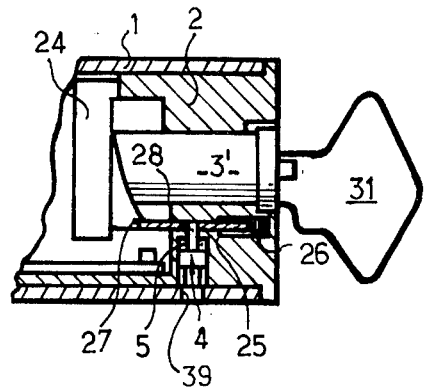
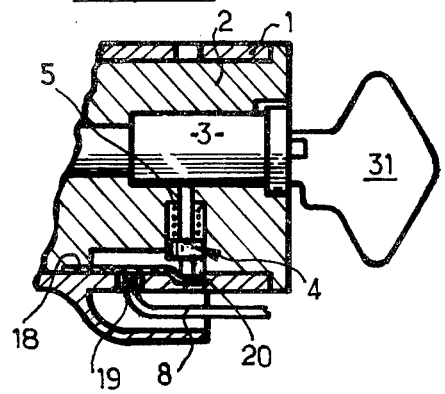
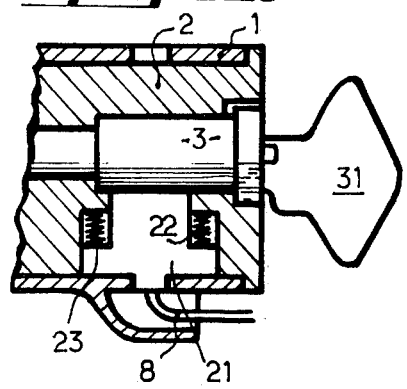
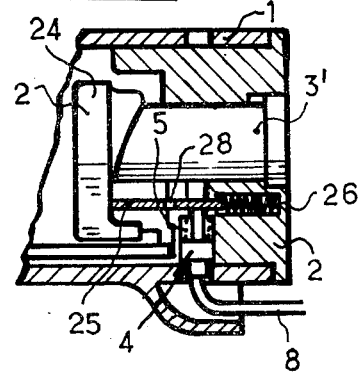

ANTI-THEFT SAFETY LOCK DEVICE WITH MEANS PREVENTING ITS UNALLOWED REMOVAL FROM THE LOCK-HOLDER

The present invention relates to anti-theft or anti-joyride safety lock devices with means preventing their unallowed removal from their lock holders or like lock-supporting casings by unauthorized persons.

Anti-theft devices of the kind comprising safety locks prevent access to or the operation of a member which is essential for using, driving or running an automotive vehicle.

These devices or appliances are secured within holders or supporting casings forming an integral part of the structures or frames of the openings or members to be protected; such affixing to the holders and supporting casings while being invulnerable or inviolable must however be releasable or removable by a skilled or initiated person commissioned for instance to replace any defective equipment.

Such an attachment should therefore show a plurality of conflicting qualities: it should be simple, efficient or effective and quickly operable, the latter feature being significant for the standardized mounting on vehicles manufactured on a mass production basis and it should at the same time be invulnerable or inviolable that is burglar-proof.

Burglars and like perpetrators of breaches of close have sought for the possibility of violating such a fastening or attachment in order to tear the anti-theft device out of its casing or like holder and to cause the locked member to be unlocked, that is released or freed without tackling the safety lock proper.

The object of the present invention is to oppose such attempts at burglary without reducing the easiness of mounting and the effectiveness of locking the anti-theft device (or the body or stator of the lock) within its casing.

The invention contemplates several means or appliances to achieve said object all of them being combined with the use of a spring-loaded locking pin or finger belonging to the anti-theft device and which is engageable with a recess provided in the casing.

The invention will be better understood and further objects, details, characterizing features and advantages thereof will become apparent as the following explanatory and descriptive specification proceeds with reference to the accompanying diagrammatic drawings given by way of non-limiting examples only illustrating several presently preferred forms of embodiment of the invention and wherein:

FIGS. 4, 5 and 6 are respective longitudinal sections through another anti-unlocking means for preventing unauthorized attempts at removal;

FIGS. 7 and 8 show in partial longitudinal section and in cross-section, respectively, a third arrangement adapted to oppose any unlocking operation;

FIGS. 9 and 10 are partial longitudinal sections illustrating a fourth embodiment of an anti-unlocking arrangement shown in two different positions, respectively;

FIG. 11 illustrates a combination of the embodiments of FIGS. 2–3 and 4–6;

FIG. 12 shows a combination of the embodiments of FIGS. 2–3 and 7–8; and

FIG. 13 shows a combination of the embodiments of FIGS. 2–3 and 9–10.

In the various embodiments illustrated in the drawings, like parts are identified by like numerals and corresponding parts, i.e., parts having similar roles, are distinguished from each other by the addition of prime marks to the reference numerals.

Figure 1:
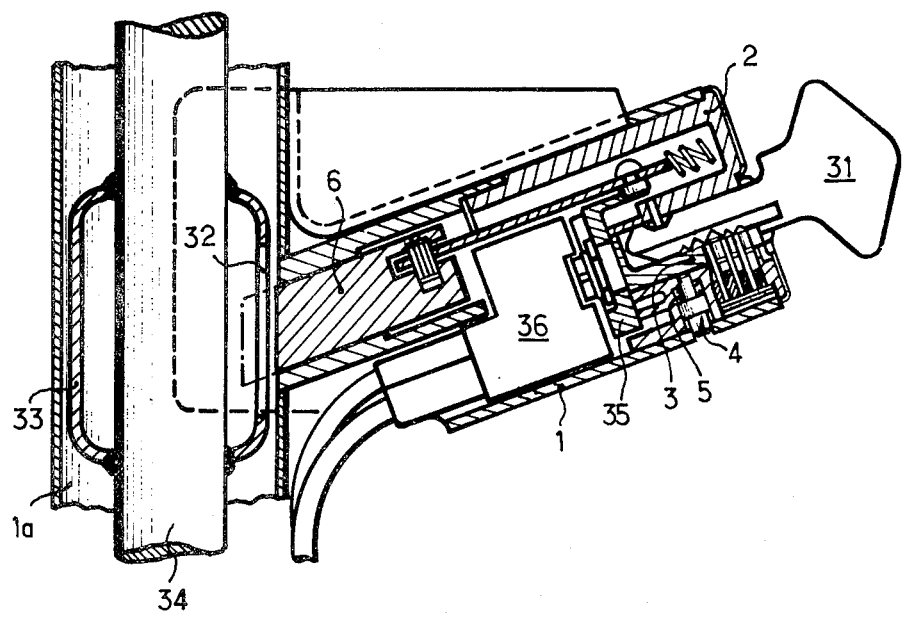
FIG. 1 shows a longitudinal sectional view of an anti-theft device assembly in its mounted condition locking the steering spindle, shaft or column by way of example and also illustrating its conventional locking within its casing in an automotive vehicle.

In FIG. 1, the anti-theft device 2 is shown as being mounted within a casing 1 fixedly secured to a tube forming a pillar, mast or post 1a surrounding the steering shaft or spindle 34 to form together the steering column. The device includes a rotor 3 or like rotary plug or tumbler cylinder rotatable by a removable key 31 and the rotary motion of which causes the lock-bolt 6 to be moved or extended towards the bolt-clasp opening 32 of a sleeve 33 forming a striking-box or like lock-staple, keeper or latch-catch integral with the steering shaft 34, for instance by means of a cam 35 driven by the rotor 3 until said lock-bolt engages said opening 32. The rotor is also operatively connected to a rotary switch 36 controlling various electric circuits of the automotive vehicle.

The locking of the stator or body 2 of the anti-theft device within the casing 1 is effected through a pin, finger or like dog member 4 slidably mounted within a radial bore 37 of the body 2 and biased radially outwards by a spring, for example a coil spring 5 surrounding the pin in coaxial relationship therewith and abutting with its radially outer end against a collar or like shoulder 4a of said pin with its opposite or radially inner end against an end wall of said bore 37. The pin 4 is thus urged resiliently by the spring 5 to engage with its radially outer end portion or head 38 after suitable location or indexing, a hole 39 provided in and extending through the wall of the casing or housing 1. The head or radially outer end 38 of the pin 4 is in principle not readily accessible except for a tool or special implement designed for driving the pin back or inwards; even though such a tool is available, however, the latter allows to retract the pin 4 inwards until disengagement from the hole 39 only when the radially inner end 40 of the pin 4 is exactly in registering aligned relation to a suitable recess 41 provided in the rotor 3; such a particular position of the recess may only be provided by operating the rotor 3 by means of the key 31. The bore 37 is connected with the bore receiving or accommodating the rotor 3 within the stator 2 by a suitable counter-bore through which the radially inner end 40 of pin 4 extends.

It is apparent that if someone succeeds by forcing or breaking in the lock or by means of a false key to put the rotor 3 in said favourable position, then it is possible to position the recess 41 in front of the radially inner end 40 of the pin 4 and by means of a tool of suitable shape and size to drive the resiliently biased pin 4 into the stator 2 of the anti-theft device and to cause the latter to slip out of the housing or casing 1 in order to be removed therefrom.

Even though the thief cannot move the rotor 3 to said favourable position, the reduced size of the recess 41 enables by forcing the pin 4 inwards towards the rotor 3, to strain, deform or distort the wall of the latter to recess same enough for causing the pin 4 to be retracted inwards sufficiently to disengage the hole 39: the pin may be forced inwards by means of a pin-drift or pin-punch and a hammer.

Figure 2:
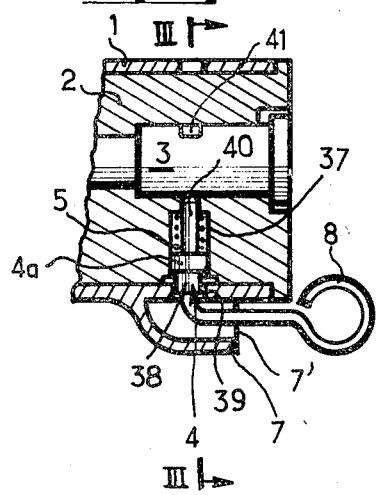
FIGS. 2 and 3 show in partial longitudinal section and in cross-section, respectively, an anti-unlocking means according to the invention for preventing unallowed removal of the anti-theft device from its holder.
Figure 3:
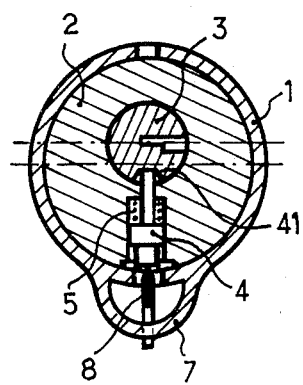

FIGS. 2 and 3 show a device generally similar to that of FIG. 1, but including a construction preventing such an attempt at removing the anti-theft device and which is adapted to shield or shelter the direct access to the hole 39 hence to the pin 4 in substantially coaxial relationship therewith by means of a hole-guard consisting of a scoop-like or cowl-shaped hood-forming shell, cap, bridge, shroud or like cover means 7 formed with at least one sidewise located opening 7' the centre line axis of which is substantially at right angles to the centre line or radially directed longitudinal axis of the hole 39 while the plane of said opening 7' is parallel with said radially directed axis of the hole 39 and laterally offset with respect thereto. Said hole-guard 7 is secured as by welding to the outside wall of the housing 1 or made integral for example cast in one piece with said housing or casing 1. A hook or cranked tool 8 having an end portion or tip bent at right angles into a nose enables to drive the pin 4 backwards or inwards if the key 31 is available but would not enable to force the pin inwards towards the rotor 3 while recessing or caving same in because it is impossible to apply a force strong enough in such a direction by means of the hook or cranked tool 8 bent at right angles at its tip the use and operation of which in engaging relationship with the pin 4 is illustrated in FIG. 3 showing the recess 41 or rotary plug 3 located in front of the radially inner end 40 of pin 4 in substantially aligned registering relationship therewith.

Another means for making the access to the locking pin 4 difficult consists in allowing its displacement only through the medium of an easily deformable element. As shown in FIGS. 4, 5 and 6, such an element may consist of a resilient strip, blade or web 18 forming a kind of leaf-spring or plate-spring accommodated in a recess 42 of the stator 2 and one end portion 43 of which is secured or suitably fastened to the latter while its other substantially hook-shaped end portion 44 bears against the terminal face of the radially outer end or head 38 of the pin 4, said hook-shaped end portion 44 and head 38 engaging a common recess 20 formed as a blind hole in the inner wall surface of the housing 1 so that said blind hole is inaccessible from the outside and its location is unknown a priori. A through-hole 19 provides access to the strip 18 for a suitable tool 45. If the rotor 3 however is not in the suitable position as shown in FIG. 5 in which it may only be brought by means of the key 31, any attempt to act upon the leaf-spring 18 would only result in a deformation thereof, the actual force exerted upon the pin 4 being in inverse ratio to or varying inversely as the lever arms so that the wall of rotor 3 in front of the radially inner end 40 of the pin 4 is subjected to a small force only which is not strong enough to force the wall inwards.

In case of a normal removal of the anti-theft device carried out by a possessor of the key 31 (see FIG. 6), the pin 4 is driven backwards that is radially inwards into the recess 41 of rotor 3 through the medium of the strip 18 engaged by a suitable tool 45, which strip should therefore be stiff or strong enough to compress or squeeze the coil spring 5.

For various grounds it may happen that the appliances described hereinabove may not be used. FIGS. 7 and 8 illustrate an arrangement which may be substituted therefor: it is adapted to make use of the passageway 46 forming the keyhole and for instance of an enlarged lateral portion 47 of the keyhole 46 for allowing the radially inner end 40 of pin 21 to be retracted inwards as shown in FIG. 8 illustrating in cross-section the unlocked condition of the stator 2 within its housing 1 which condition is obtained by the use of a suitable tool 45. Such a construction enables to significantly increase the twist-and-shear resisting cross-sectional area, i.e., the torsion and shear strength of the pin 21 hence its ability to withstand any break as shown in FIG. 7 wherein the locking finger 21 is kept in its normal locking position by the action of springs 22 and 23. The finger 21 consists in this instance of a substantially T-shaped flat plate slidably mounted in a slot-like hole 37a provided in the stator 2 and formed with a radially outward directed central extension 21a adapted to project into the through-hole 39 formed in the housing 1. The pair of springs 22, 23 are located on either side of the finger 21 and bear against the sidewise projecting legs, respectively, of the T-shaped finger 21, in parallel relation to each other.

Another embodiment of the anti-unlocking means is shown in FIGS. 9 and 10 wherein a small plate 25 made for instance from treated steel and accordingly exhibiting a high strength is slidably interposed within the stator 2 and displaceable by means of a cam 24 movable with rotor 3' and which may be integral with an operating cam controlling the motion of the lock-bolt.

The plate 25 is biased by a release-spring 26 and forms an abutment or like stop for the pin 4 when the latter is pushed thereagainst by overcoming the force of its return spring 5. A hole 28 provided in the sliding plate 25 enables to retract the pin 4 therein to disengage the hole 39 in the casing 1 when the cam 24 for a selected position of the rotor and its key causes a suitable displacement of the plate 25 so as to position the hole 28 in front of the radially inner end 40 of the pin 4 which may then be retracted therein by merely pushing on the head 38 of the pin 4.

At least some of the means described hereinabove may be combined with each other as shown in FIGS. 11 to 13.

Thus, the hole-guard 7 of the arrangement illustrated in FIGS. 2 and 3 may be combined:
either as illustrated in FIG. 11 with the second embodiment shown in FIGS. 4 to 6;
or as illustrated in FIG. 12 with the third embodiment shown in FIGS. 7 and 8;
or as depicted in FIG. 13 with the fourth embodiment shown in FIGS. 9 and 10:
while thereby increasing the effectiveness of the means so combined with each other. Moreover, instead of providing one single locking finger 4 or 21 there may be provided several or a plurality of locking fingers distributed about the stationary casing or support 1 inside thereof for engagement with corresponding holes and recesses formed in said casing and in the rotary plug 3, respectively.

Of course, the invention is by no means limited to the forms of embodiment described and illustrated, which have been given by way of example only. In particular, it comprises all the means constituting technical equivalents to the means described as well as their combinations, should the latter be carried out according to the gist of the invention as set forth in the appended claims.

What is claimed is:

1. An anti-theft device including an operator's key-responsive safety lock comprising: a stationary hollow casing; a body portion forming a stator provided with a longitudinal bore and removably mounted in said casing; a tumbler cylinder forming a rotary plug rotatably fitted within said longitudinal bore of said stator and formed with a key-hole for receiving a removable plug-actuating key for rotating said plug in either direction to and from a plurality of angular positions; said casing being provided with a hole opening at least at the inner wall surface of said casing; said rotary plug being provided on its radially outer side wall surface with a recess adapted to be aligned in registering relationship with said hole through rotary displacement of said plug; said stator being formed with a transversely extending bore opening with its opposite ends towards said rotary plug and towards said hole of said casing, respectively; and a spring-loaded locking finger slidably mounted in said bore of said stator and engageable endwise with either of said hole in said casing and of said recess in said rotary plug, said locking finger having such a length that upon its engagement with said hole in said casing, said finger securely locks said stator within said casing and is disengaged from said recess in said rotary plug and that upon the engagement of said finger with said recess in said rotary plug, said finger disengages said hole in said casing thereby releasing said stator from said casing, said locking finger being biased by its spring so as to be urged towards its casing hole engaging position; wherein the improvement consists in the provision of means adapted to prevent said locking finger to be subjected to a coaxial radially inwards directed thrust force capable to cause said locking finger to be driven into the side wall of said rotary plug when the angular position of the latter is such that said recess in said plug is out of alignment with said locking finger, said hole in said casing extending throughout the thickness of the wall of said casing so as to open to the outside thereof, said means preventing the application of such a thrust force including hole-guard means rigidly secured to the outside wall of said casing and covering said hole in said casing in spaced relationship therewith, said hole-guard means being formed with at least one sidewise located opening the centre line axis of which is substantially at right angles to the longitudinal axis of said hole whereas the plane of said opening is parallel with said longitudinal axis of said hole and laterally offset with respect thereto.

2. An anti-theft device including an operator's key-responsive safety lock comprising: a stationary hollow casing; a body portion forming a stator provided with a longitudinal bore and removably mounted in said casing; a tumbler cylinder forming a rotary plug rotatably fitted within said longitudinal bore of said stator and formed with a key-hole for receiving a removable plug-actuating key for rotating said plug in either direction to and from a plurality of angular positions; said casing being provided with a hole opening at least at the inner wall surface of said casing; said rotary plug being provided on its radially outer side wall surface with a recess adapted to be aligned in registering relationship with said hole through rotary displacement of said plug; said stator being formed with a transversely extending bore opening with its opposite ends towards said rotary plug and towards said hole of said casing, respectively; and a spring-loaded locking finger slidably mounted in said bore of said stator and engageable endwise with either of said hole in said casing and of said recess in said rotary plug, said locking finger having such a length that upon its engagement with said hole in said casing, said finger securely locks said stator within said casing and is disengaged from said recess in said rotary plug and that upon the engagement of said finger with said recess in said rotary plug, said finger disengages said hole in said casing thereby releasing said stator from said casing, said locking finger being biased by its spring so as to be urged towards its casing hole engaging position; wherein the improvement consists in the provision of means adapted to prevent said locking finger to be subjected to a coaxial radially inwards directed thrust force capable to cause said locking finger to be driven into the side wall of said rotary plug when the angular position of the latter is such that said recess in said plug is out of alignment with said locking finger, and wherein said hole in said casing is a blind hole and said stator comprises a longitudinally extending open cavity formed in the outside lateral wall of said stator and extending substantially at right angles to said transverse bore for said locking finger; and a resiliently deformable strip secured with one end into the outer side wall of said stator so as to be tangentially embedded therein, said strip having a substantially straight portion parallel to the inside wall of said casing and projecting over said recess and terminating at its opposite end by a sidewise outwards offset tip portion engageable with said hole in said casing and adapted to bear against the adjacent end of said locking finger, said strip resting in its unstrained and non-deformed position against the inner side wall of said casing with its tip portion engaging said blind hole in said casing, said blind hole being deep enough to also accommodate the adjacent end of said locking finger; said casing being formed with an orifice extending through the side wall of said casing and located in front of said straight portion of said strip; the free length of said strip being long enough to allow an intermediate portion of said strip to be forced inwards into contact with said stator while still keeping bearing against the terminal face of the adjacent end of said locking finger; said strip being stiff enough to allow when pushed inwards through said orifice to drive said locking finger into said plug recess when the latter registers with said finger.

3. A device according to claim 2, comprising a hole-guard secured to the outer wall surface of said casing and covering said orifice formed in said casing in radially spaced relation thereto said hole-guard being formed with at least one sidewise located opening the centre line axis of which is substantially at right angles to the centre line axis of said orifice while the plane of said opening is parallel with the centre line axis of said orifice and laterally offset with respect thereto.

4. An anti-theft device including an operator's key-responsive safety lock comprising: a stationary hollow casing; a body portion forming a stator provided with a longitudinal bore and removably mounted in said casing; a tumbler cylinder forming a rotary plug rotatably fitted within said longitudinal bore of said stator and formed with a key-hole for receiving a removable plug-actuating key for rotating said plug in either direction to and from a plurality of angular positions; said casing being provided with a hole opening at least at the inner wall surface of said casing; said rotary plug being provided on its radially outer side wall surface with a recess adapted to be aligned in registering relationship with said hole through rotary displacement of said plug; said stator being formed with a transversely extending bore opening with its opposite ends towards said rotary plug and towards said hole of said casing, respectively;

and a spring-loaded locking finger slidably mounted in said bore of said stator and engageable endwise with either of said hole in said casing and of said recess in said rotary plug, said locking finger having such a length that upon its engagement with said hole in said casing, said finger securely locks said stator within said casing and is disengaged from said recess in said rotary plug and that upon the engagement of said finger with said recess in said rotary plug, said finger disengages said hole in said casing thereby releasing said stator from said casing, said locking finger being biased by its spring so as to be urged towards its casing hole engaging position; wherein the improvement consists in the provision of means adapted to prevent said locking finger to be subjected to a coaxial radially inwards directed thrust force capable to cause said locking finger to be driven into the side wall of said rotary plug when the angular position of the latter is such that said recess in said plug is out of alignment with said locking finger, said hole in said casing extending throughout the thickness of the wall of said casing so as to open to the outside thereof, and wherein said recess is formed by a longitudinally extending slot formed sidewise in said rotary plug and opening into said keyhole thereof; said locking finger consisting of a substantially T-shaped longitudinally enlarged plate engageable at its radially inner end with said slot whereas its radially outer end is formed with a small projection engageable with said hole in said casing, there being provided a pair of biasing springs co-operating with the side legs of said T-shaped plate, respectively.

5. A device according to claim 4, comprising a hole-guard secured to the outside wall surface of said casing and covering said through-hole in said casing in radially spaced relationship therewith, said hole-guard being formed with at least one sidewise located opening the centre line axis of which is substantially at right angles to the centre line axis of said through-hole in said casing while the plane of said opening is parallel to said centre line axis of said through-hole in said casing and laterally offset with respect thereto.

6. An anti-theft device including an operator's key-responsive safety lock comprising: a stationary hollow casing; a body portion forming a stator provided with a longitudinal bore and removably mounted in said casing; a tumbler cylinder forming a rotary plug rotatably fitted within said longitudinal bore of said stator and formed with a key-hole for receiving a removable plug-actuating key for rotating said plug in either direction to and from a plurality of angular positions; said casing being provided with a through hole opening at the inner wall surface and outer wall surface of said casing; said stator being formed with a transversely extending bore opening with its opposite ends towards said rotary plug and towards said hole of said casing, respectively; and a spring-loaded locking finger slidably mounted in said bore of said stator and engageable endwise with said hole in said casing, said locking finger being biased by its spring so as to be urged towards its casing hole engaging position; said hole in said casing extending throughout the thickness of the wall of said casing so as to open to the outside thereof, a cam member operatively connected to said rotary plug to be rotatable therewith, a slot formed in said stator and extending in substantially parallel relation to the longitudinal axis of rotation of said plug, said transverse bore for accommodating said locking finger opening into said slot which opens itself towards said cam member; a spring-loaded plate element slidably mounted within said slot and urged by its biasing spring into endwise engagement with said cam member whereby said plate element is movable between two end positions, namely a stator-unlocking position into which it is pushed back against the force of its biasing spring by said cam member upon rotation of said plug to a given angular position and a stator-locking position into which it is pushed forward by its biasing spring when said cam member is rotated to any other angular position; and a through-hole formed in said plate member and large enough to allow said through hole to be engaged by said locking finger, said through hole in said plate element being so located that it registers with said locking finger when said plate element assumes said stator-unlocking position whereas said through-hole in said plate element is out of alignment with said locking finger for any other position of said plate element; the depth of said through-hole in said plate element and the length of said locking finger being sufficient to allow said locking finger to disengage said through-hole in said casing when said locking finger engages said through-hole in said plate element, and means adapted to prevent said locking finger from being subjected to a coaxial radially inwards directed thrust force capable of causing said locking finger to be driven into the plate element when the angular position of the rotary plug is such that said through-hole in said plate element is out of alignment with said locking finger.

7. A device according to claim 6, including a movable lock-bolt slidably mounted in said stator and movable between an inoperative inwards retracted position and an operative outwards extended position; and cam means for actuating said lock-bolt and operatively connected to said rotary plug to be rotatable therewith; wherein said cam member is integral with said cam means.

8. A device according to claim 6, including a hole-guard secured to the outside wall surface of said casing and covering said through-hole in said casing in radially spaced relationship therewith, said hole-guard being formed with at least one sidewise located opening the centre line axis of which is substantially at right angles to the centre line axis of said through-hole in said casing while the plane of said opening is parallel to said centre line axis of said through-hole in said casing and laterally offset with respect thereto.

* * * * *